United States Patent [19]

Dutzler

[11] 3,983,631
[45] Oct. 5, 1976

[54] MACHINE-PROFILE-MEASURING INSTALLATION INSERTABLE INTO THE ROLLER CONVEYOR OF A CONTINUOUS CASTING MACHINE AND A METHOD OF MEASURING THE MACHINE PROFILE

[75] Inventor: Wilhelm Dutzler, Linz, Austria

[73] Assignee: Vereinigte Osterreichische Eisen- und Stahlwerke-Alpine Montan Aktiengesellschaft, Linz, Austria

[22] Filed: Aug. 14, 1974

[21] Appl. No.: 497,375

[30] Foreign Application Priority Data

Sept. 10, 1973  Austria .............................. 7805/73

[52] U.S. Cl. ............................ 33/143 L; 33/147 K; 33/147 N; 33/168 B; 33/174 L; 33/DIG. 7; 72/35

[51] Int. Cl.[2] ...................... G01B 5/14; G01B 3/46; G01B 7/14; B21B 31/34

[58] Field of Search ............... 72/35; 33/182, 178 F, 33/174 L, 168 B, 147 K, 147 N, 141 B, 143 L, 174 H, DIG. 7; 73/141 A

[56] References Cited
UNITED STATES PATENTS 2,908,085   10/1959   Price et al. ...................... 33/178 F
3,418,850   12/1968   Goddin ............................ 73/141 A

FOREIGN PATENTS OR APPLICATIONS 1,102,947   10/1955   France ............................. 33/182

Primary Examiner—Richard E. Aegerter
Assistant Examiner—Steven L. Stephan
Attorney, Agent, or Firm—Brumbaugh, Graves, Donohue & Raymond

[57] ABSTRACT

The invention relates to a measuring installation for measuring the machine profile of a continuous casting machine. A strand-like body of elastically deformable material, e.g. rubber or plastics, corresponding to the nominal machine profile is insertable into the roller conveyor of the continuous casting machine. Into the strand-like body at least one measuring device is embedded, which device measures and/or records the actual machine profile, i.e. the clear distance between rollers lying opposite each other or the distance of each roller from the neutral fiber of the strand-like body. The invention also relates to a method of measuring the machine profile of a continuous casting machine, which method consists in that after an exact alignment of the individual rollers in accordance with the nominal machine profile, i.e. after putting the continuous casting machine into operation, the measuring device is pulled or pushed through the roller conveyor at intervals and the deviation of the rollers from the nominal machine profile is recorded continuously. By using the measuring installation with the method of the present invention it is possible to determine rapidly any discontinuities occurring during casting, thus avoiding cracks or even breaks in the strand.

25 Claims, 9 Drawing Figures

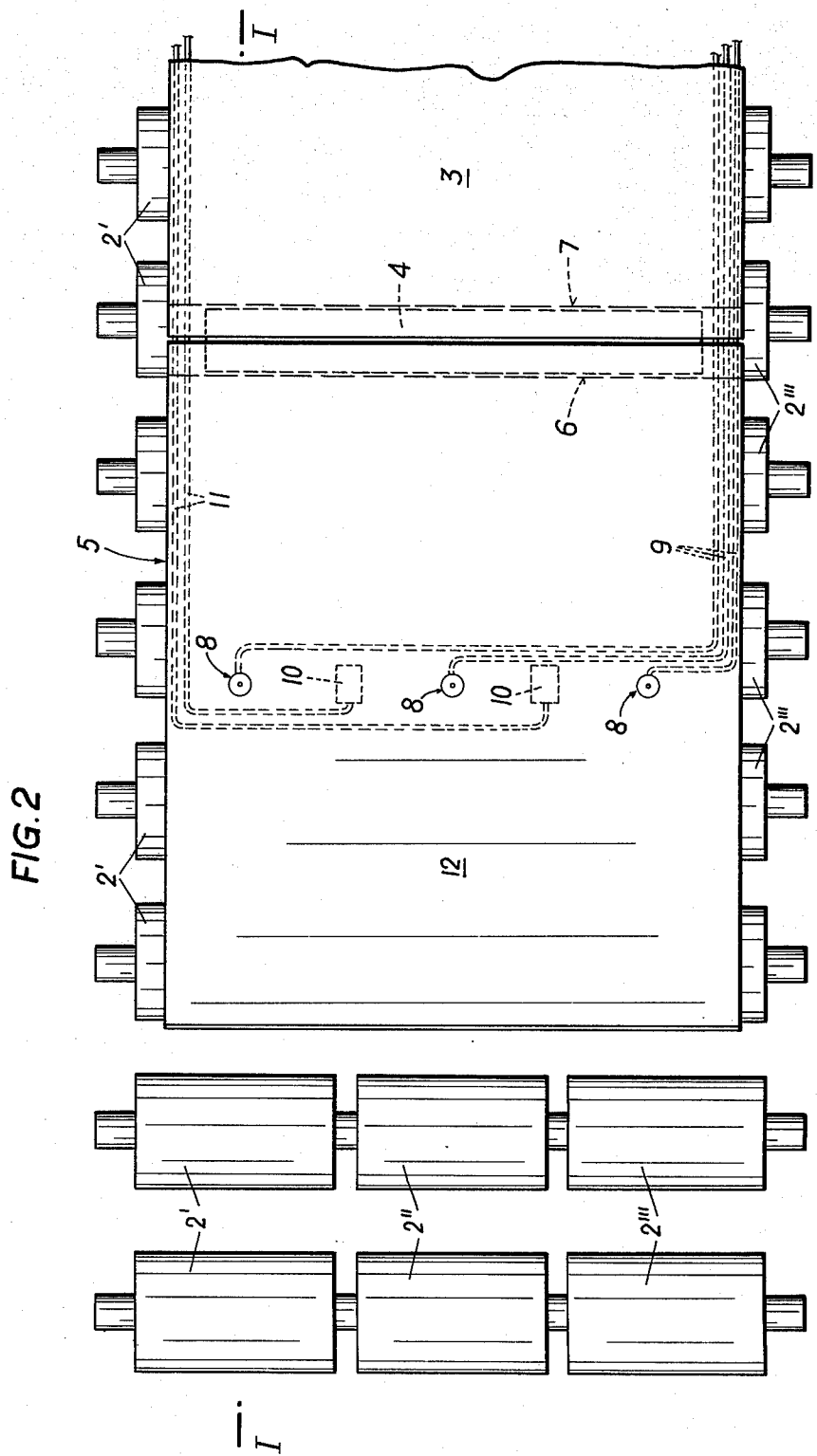

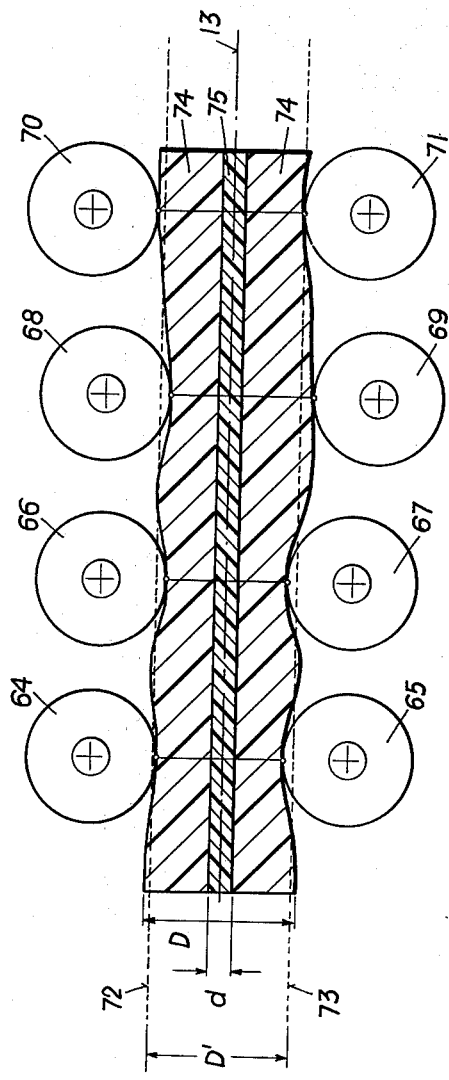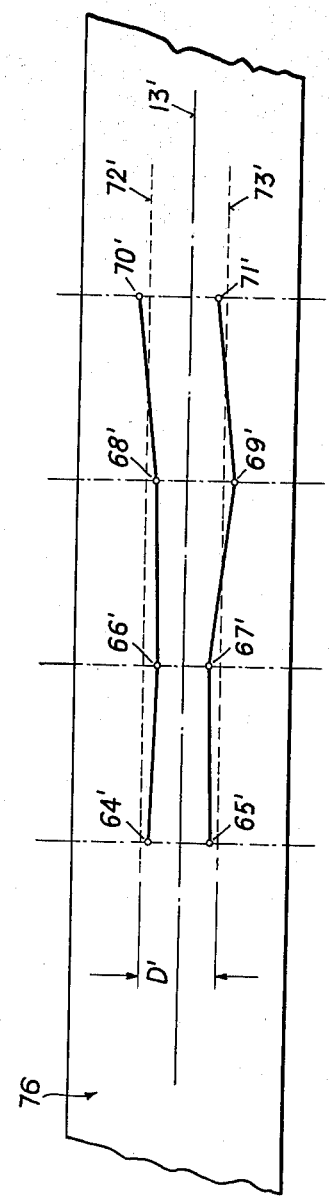
FIG. 8
FIG. 9

MACHINE-PROFILE-MEASURING INSTALLATION INSERTABLE INTO THE ROLLER CONVEYOR OF A CONTINUOUS CASTING MACHINE AND A METHOD OF MEASURING THE MACHINE PROFILE

BACKGROUND OF THE INVENTION

In continuous casting plants of modern construction consisting of a vertically arranged mold and a guiding zone for the strand arranged to follow the mold, where the guiding zone is arc-shaped and makes a transition to the horizontal, it is of great importance in achieving good quality continuously cast strands that the strand be guided with exactness between its supporting, guiding and bending rollers. It is therefore necessary to compare rapidly and objectively the graphically determined or theoretical machine profile — i.e. the nominal machine profile, with the actual machine profile as it exists after a period of operation or after repairs, so that individual rollers and/or parts of the roller conveyor, e.g. in the bending or straightening zone of the continuous casting machine, may be adjusted accordingly. Hitherto, it has been necessary to measure in laborious and time-consuming detail, the clearance between the individual roller pairs in several places and to record all the data gained. Then, after a comparison with the nominal machine profile, it was possible to proceed to the required adjustment work. In a continuous operation of a continuous casting machine a lot of time is needed for carrying out this work. Apart from this aspect it has hitherto not been possible to find deviations, i.e. a discontinuity, between individual roller conveyer parts, which form the conveyor. As a consequence of such a discontinuity between parts of the roller conveyor, cracks may occur in the casting. Moreover, when there are irregular roller distances, the withdrawing forces for the casting increase considerably and under extreme circumstances the strand might even break. It is even more difficult, if not altogether impossible, to determine exactly and rapidly the curvature or curvature alteration in the transition zone from a vertical guiding path to a circular arc and/or from a circular arc to a horizontal guiding path, and to compare this curvature or curvature alteration with the nominal profile.

SUMMARY OF THE INVENTION

The present invention comprises a measuring device or apparatus for measuring the machine profile of a continuous casting plant. This is accomplished by inserting the device into the roller conveyor of the continuous casting machine. The measuring device is a strand-like body corresponding to the nominal machine profile and is made of an elastically deformable material, e.g. rubber or plastics. In this body at least one measuring device is embedded, which indicates and/or records the actual machine profile, i.e. the corresponding clearance between rollers lying opposite each other or the distance of each individual roller from the neutral fiber of the strand-like body.

According to a preferred embodiment the strand-like body is made from an elastomeric plastic material, preferably of polychlorobutadiene, butadiene/styrene-interpolymer or butadiene/acrylnitrile-interpolymer. Its thickness is from 1 to 10% bigger than the desired distance of the rollers and its longitudinal extension is at least three times, preferably four times, longer than the distance between adjacent roller axes of the roller conveyor.

The measuring devices are preferably inductive displacement pickups arranged in pairs and lying opposite each other. They are arranged on a plate consisting e.g. of steel and are fastened in the neutral fiber of the strand-like body. The feelers of the inductive displacement pickups are movable axially and perpendicularly in relation to the neutral fiber and are capable of being brought into touching contact with the rollers.

It is, however, also possible for the measuring device to use pressure-measuring devices, e.g. pressure pickups arranged on a plate consisting of steel and being fastened in the neutral fiber of the strand-like body. Thrust bolts of such devices, which are movable axially and perpendicularly in relation to the neutral fiber, are placed in touching contact with presssure plates (consisting e.g. of steel) that are embedded close to the surface of the strand-like body.

In a preferred embodiment of the invention the strand-like body, which is made of an elastically deformable material, is provided in its center range, i.e. in the range of the neutral fiber, with a layer of non-deformable, yet elastically bendable, material. On this layer the measuring devices, possibly together with devices for measuring the expansion of this layer are arranged.

The central layer may be made from a thermosetting material, preferably a pure compression molding resin, or from a thermoplastic material, preferably polystyrene, polymethacrylic ester, polyvinylchloride, polymethylenoxyde, higher esterified cellulose acetate, cellulose acetobutyrate, cellulose nitrate, ethyl cellulose, polyamide or polyurethan. The thickness of this layer should be $(0.02$ to $0.5)\times D$, where D is the total thickness of the strand-like body.

It is, however, also possible to use a layer made of a 1 to 5 mm thick mild steel strip containing maximumly 0.10% C and 0.20 to 0.45% Mn. This steel strip could be produced by hot rolling and/or cold rolling.

So as to be able to determine the curvature or curvature alteration in the roller conveyor of the continuous casting plant or discontinuities between individual parts of the roller conveyor, expansion-measuring strips may be provided as a measuring device for measuring the expansion of the layer lying in the range of the neutral fiber. These expansion-measuring strips are placed opposite each other in pairs and are secured to the layer.

For all embodiments of the invention it is advantageous that the strand-like body or the steel strip, respectively, be connectable by means of a detachable coupling to a dummy bar of the continuous casting machine and that the strand-like body be movable through the roller conveyor by means of the dummy bar. In such a case measuring of the measuring devices, which leads are connected with an indicator, are preferably laid within the strand-like body and/or the dummy bar.

The invention also comprises a method of measuring the machine profile of a continuous casting machine using a measuring installation. With this method, after an exact alignment of the individual rollers corresponding to the nominal machine profile, i.e. after putting the continuous casting machine into operation, the measuring device is pulled or pushed through the roller conveyor at intervals and the deviation of the individual rollers from the nominal machine profile, i.e. the actual machine profile, is recorded continuously.

As a further feature of the method, when measuring a continuous casting machine having a curved roller conveyor or curved roller conveyor parts, the expansion of the neutral fiber of the strand-like body is continuously recorded. This fiber is made from a layer of non-deformable, yet elastically bendable material. The recorded expansion information is used for measuring or checking the curvature of the roller conveyor or roller conveyor parts.

BRIEF DESCRIPTION OF THE DRAWINGS

In order that the invention may be more fully understood, it will now be described in more detail by way of example with reference to the accompanying drawings:

FIG. 2 is a plan view of FIG. 1, i.e. a top view of the measuring installation of the present invention with the upper roller conveyor in lifted position and the measuring device resting on the lower roller conveyor;

FIG. 8 schematically shows the elastic deformation of a measuring installation caused by supporting and guiding rollers deviating greatly from the desired machine profile; and FIG. 9 shows a pertaining measuring strip, upon which the deviation of the actual machine profile from the nominal machine profile is recorded schematically.

DESCRIPTION OF EXEMPLARY EMBODIMENTS

Figure 1:
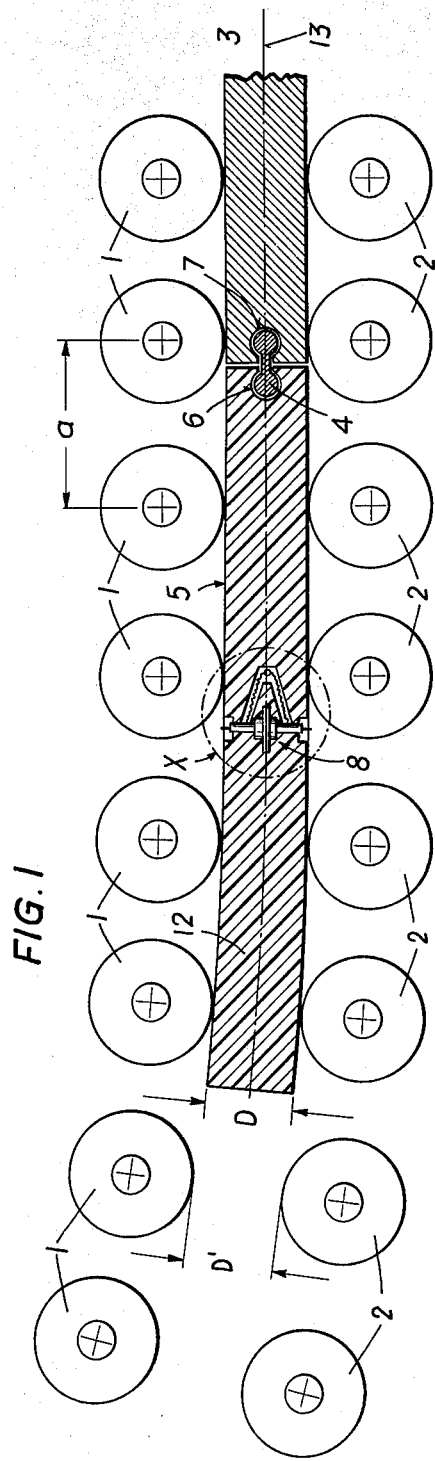
FIG. 1 illustrates schematically a vertical section through part of a roller conveyor of a continuous casting plant, i.e. at the transition from the straightening zone of an arc-shaped plant to the horizontal strand-guiding zone.

In FIGS. 1 and 2 roller conveyors with freely rotatable and/or driven rollers 1 and 2 lying opposite each other are illustrated. These rollers have a clear distance D' of 170 to 300 mm corresponding to the nominal machine profile. Reference letter D' in FIG. 1 corresponds substantially to the thickness of a hot strand of a continuous casting plant for slabs. Each roller may — as can be seen from FIG. 2 — consist e.g. of three parts (2', 2'' and 2'''), and may be integrally connected with each other or may be adjustable to the strand individually. Reference number 3 denotes a commonly used dummy bar, which in normal casting procedures is used for closing of the mold bottom for a short time at the beginning of the casting procedure and subsequently for withdrawing the hot strand. Such a dummy bar usually has individual steel segments connected articulately with each other. The bar is moved by driven withdrawing rollers (not illustrated) or by means of some other device. The measuring installation 5 of the present invention, which may be referred to as an "artificial hot strand" is coupled by means of a detachable coupling 4 to the end of the dummy bar with the help of the dummy bar 3, the device 5 is pulled through the entire roller conveyor 1, 2. The coupling 4 is inserted laterally and detachably into corresponding recesses 6 and 7 in the measuring installation 5 or in the dummy bar 3.

In the embodiment of FIG. 2 the measuring installation 5 has three roller-distance-measuring devices 8 arranged transversely in relation to the strand transport direction and assigned to the rollers (2', 2'' and 2'''). By means of measuring leads 9 laid within the measuring installation 5 the devices 8 are connected with a stationary indicator (not illustrated). For this purpose corresponding bores, in which the leads 9 are laid, are provided in the strand-like body 12 carrying the measuring devices 8. These leads 9 are also passed through the dummy bar 3 — preferably at the side thereof — because they are more accessible there. Two measuring devices 10 for determining deviations of the curvature of the roller conveyor (1 and 2) from the nominal profile of the casting machine are connected in the same way as devices 8 via measuring leads 11, with other indicators (not illustrated).

The strand-like body 12 is made of an elastically deformable material, e.g. rubber or plastics, and has a thickness D, which is somewhat bigger (preferably by 1 to 10%) than D', the continuous clear distance in the nominal machine profile. The strand 12 is made e.g. of a plastics material from the group of the elastomers, as they are characterized in the following table 1.

Table 1

| Plastics suitable for producing a strand for measuring the machine profile | | | |
|---|---|---|---|
| | Mechanical Properties | | |
| | Tensile strength kp/mm² | Notch toughness kp.cm/cm² | Breaking elongation % |
| Polychlorobutadiene ("Neopren") | 2.25 | 55 | 950 |
| Butadiene/styrene-interpolymer (Buna S") | 2.2 | 60 | 600 |
| Butadiene/acrylnitrile-interpolymer ("Perbunan") | 2.2 | 60 | 600 |

When the strand-like body 12 passes through the continuous casting machine the rubber or plastics substance is compressed more or less strongly in those places where the rollers (1 and 2) deviate from the nominal machine profile, the deviations being immediately ascertainable by means of the measuring devices 8. When the plastic strand 12 is being compressed its neutral fiber 13 remains practically unaltered, i.e. its position corresponds to the position of the neutral fiber of a hot strand if the plastic strand 12 extends over several rollers. The length of the plastic strand is four times the distance of the roller axes $a$ shown in FIG. 1.

Figure 4:
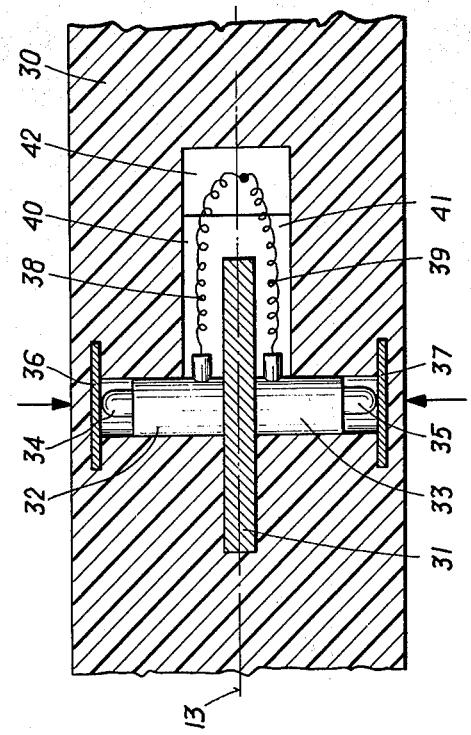
FIG. 4 is an illustration similar to FIG. 3, yet for another embodiment of the invention.
Figure 3:
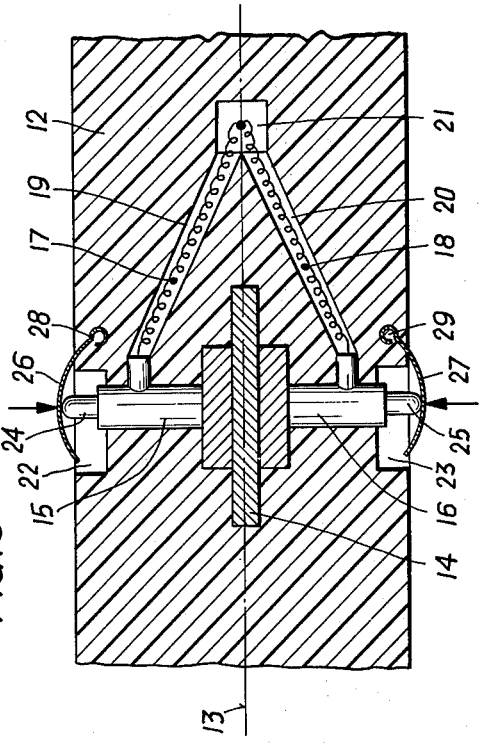
FIG. 3 shows a detail "X" of FIG. 1 on an enlarged scale.
Figure 5:
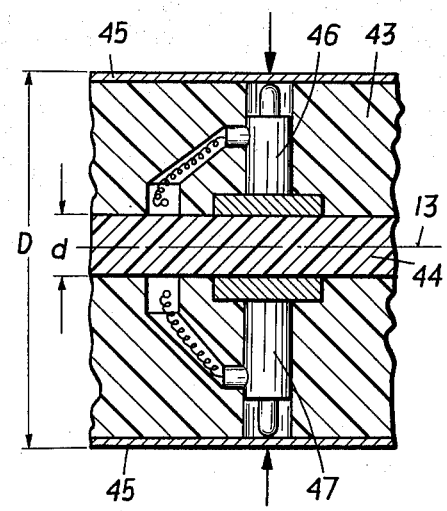
FIGS. 5 and 6 show further embodiments of the invention in vertical section and in an illustration similar to FIG. 3.

The actual distance (the actual machine profile) may be determined by means of the measuring devices as they are illustrated in FIGS. 3 to 5.

According to FIG. 3 in the range of the neutral fiber 13, a fastening plate 14, consisting e.g. of steel, is embedded in the plastic strand Figs. The plate 14 receives two inductive displacement pickups 15 and 16 of a construction known per se. These pickups are arranged opposite each other and are connected with an indicator (not shown) via electric measuring leads 17 and 18 laid in bores 19 and 20, and a channel 21, respectively. In the area of the surface of the plastic strand 12 in recesses 22 and 23, feelers 24 and 25 of the inductive displacement pickups 15 and 16 are axially movable, i.e., in the direction of the application line of the pressure forces indicated by the arrows in the FIGS. For the protection of the feelers leaf springs 26 and 27 are provided, which are embedded in the plastic substance 12 at 28 and 29.

According to FIG. 4 a fastening plate 31 cast into the plastic strand 30 has pressure-measuring devices 32 and 33, e.g. a conventional pressure pickup, fastened either side of the plate. Thrust bolts 34 and 35 of the devices act together with steel pressure plates 36 and 37. The pressure plates 36 and 37 are cast into the strand 12 close to the surface and the pressure transmitted by plates is a measure of the deviation of the rollers 1 and 2 from the nominal machine profile. Measuring leads 38 and 39 are laid in bores 40 and 41 and in a channel 42 and are connected with a measuring device which records the values indicated.

According to FIG. 5 a elastically deformable plastic strand 43 is provided with a hard, but bendable, core layer 44 of plastic with a thickness $d$. The thickness $d$ amounts to approx. $(0.02$ to $0.5) \times D$, where D is the thickness of the entire plastic strand. In this embodiment the strand 43 may also be provided at either side with a thin metal wearing plate 45 for its protection. The core layer 44 represents in a certain sense the neutral fiber 13 and it is used to support the above mentioned inductive displacement pickups 46 and 47. The pressure of the rollers 1 and 2 is transmitted to the pickups via the protecting plates 45.

Figure 6:
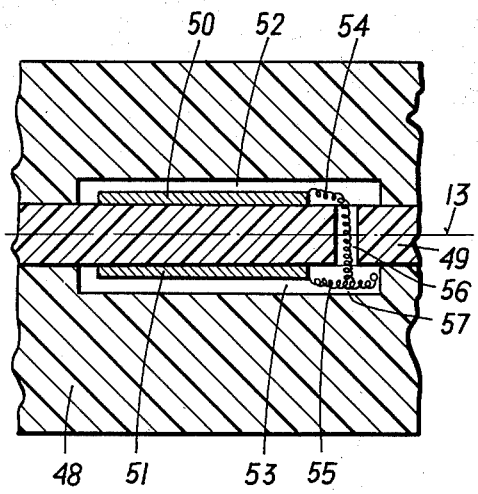

In FIG. 6 the plastic strand 48, which is made of an elastically deformable material, is again provided with a hard core layer 49 that is not capable of being deformed or compressed. This core is made of a plastic material such as those in table 2. On this hard plastic layer 49, in the area of the neutral fiber 13, conventional expansion-measuring strips 50 and 51 are arranged. These strips are freely extensible and are located opposite each other at either side of the fiber 13 in recesses 52 and 53. The expansion-measuring strips 50 and 51 are glued to the layer 49. The corresponding measuring leads 54 and 55 leading to indicators (not illustrated) for the expansion of the layer 49 upon passage through curved roller conveyors or at discontinuities between roller conveyor parts, are laid in bores 56 and 57, respectively.

steel strip of a mild unalloyed steel containing less than 0.10% C and 0.20 to 0.45% Mn, with the remainder iron and common impurities. A coupling 63 connects the strand with a dummy bar 62. A measuring device including the expansion-measuring strips 50 and 51 for determining the curvature of the steel strip 61 is denoted with 10.

From FIGS. 8 and 9 one can observe the measuring procedure for determining the deviations of the rollers 64, 65, 66, 67, 68, 69, 70 and 71 from the nominal machine profile 72, 73 (drawn in dotted lines) — corresponding to a continuous clear distance D'. The plastic strand 74 of FIG. 8 with its measuring devices 8 (not illustrated in this drawing), a thickness D>D' and a hard core layer 75 which cannot be compressed, follows, in an exaggerated illustration, approximately the contour drawn in a thick line in FIG. 8. Since the neutral fiber 13 of the strand does not alter its position, the measuring lines indicate the respective distance of the rollers from the neutral fiber 13.

The measuring strip 76, schematically illustrated in FIG. 9, has drawn the nominal machine profile (lines 72' and 73') and the points of contact of the rollers 64 to 71 deviating from the nominal machine profile are denoted with 64' to 71'. The fully drawn lines show the actual machine profile. The neutral fiber 13' is also shown on the paper strip 76 of the recorder connected to the indicator.

In the same manner one can measure in one single operation all the deviations — including those of the layer 75 — and can record them.

What I claim is:

1. A machine-profile-measuring installation for use in a continuous casting plant having a roller conveyor in which a plurality of rollers is arranged in pairs at a certain distance opposite each other and the pairs are at certain distances from each other so as to establish a certain machine profile for the roller conveyor, the rollers of said roller conveyor contacting a cast strand and transporting it from a vertical direction into a horizontal direction, said measuring installation comprising:

a strand-like body substantially equivalent in size to the nominal machine profile of the conveyor and being insertable between the rollers of each pair of Table 2

Plastics materials suitable for forming the core layer (13, 49) of a plastics strand according to the invention; mechanical properties

|  | Tensile strength kp/mm$^2$ | Modulus of elasticity kp/mm$^2$ | Bending strength kp/mm$^2$ | Notch toughness kp.cm/cm$^2$ | Breaking elongation % |
|---|---|---|---|---|---|
| pure compression molding resin | 4.2 to 6.3 | 500 to 700 | 8.4 to 12 | 0.8 to 1.6 | 0.7 |
| polystyrene, type III | 6 | 240 | 10 | 2 to 3 | 1 to 35 |
| polymethacrylic ester | 7.8 | 280 to 420 | 14 | — | 1 to 4 |
| polyvinylchloride, type PVC | 5 to 6 | 150 | 9.5 to 11.5 | 10 to 30 | 20 to 100 |
| polymethylenoxyde | 7 | 287 | 10.5 | — | 15 to 75 |
| cellulose acetate, type S | 7.4 | 210 | 9 | 6 | 4 to 55 |
| cellulose acetobutyrate, type B | 4.3 | 170 | 5.6 | 5 | 40 to 88 |
| cellulose nitrate | 6 to 7 | 250 | 6 | 20 to 30 | 40 to 45 |
| ethyl cellulose | 5 to 6 | 140 to 280 | 6.3 to 7 | — | 10 to 40 |
| polyamide, type A | 8.5 | 275 | 11 | 3 | 40 |
| polyurethan, type U$_{20}$ | 5 | 71 | 4.5 | 12 | 80 |

Figure 7:
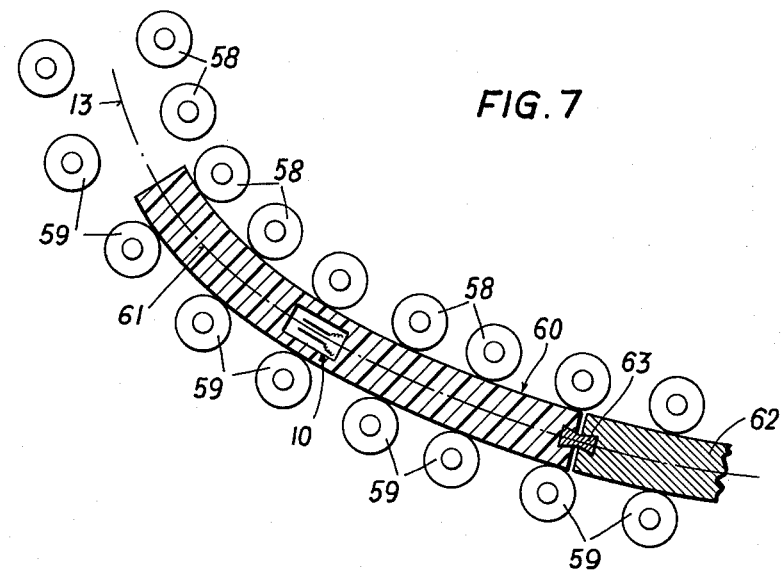
FIG. 7 illustrates a curved roller conveyor, through which a measuring device with expansion-measuring strips for determining the curvature or curvature alteration is passed.

Instead of the plastic layers of the thickness $d$ mentioned in table 2, one can also use metal layers 61 with thinner walls, as is shown in FIG. 7 with reference to a plastics strand 60, for measuring an arc-shaped roller conveyor with the rollers 58 and 59. In this case 61 denotes a 1 to 5 mm thick hot-rolled or cold-rolled rollers of the conveyor, said body being made of an elastically deformable material with a neutral fiber; and at least one displacement measuring device for determining the actual machine profile of the roller conveyor, said measuring device having measuring leads and displaceable sensors, and being embedded in said body at the level of the neutral fiber, said measuring device determining the actual machine profile by measuring the displacement of its sensors so as to establish at least one of (A) the clear distance between the rollers lying opposite each other or (B) the distance of each roller from the level of the neutral fiber of the strand-like body.

2. The machine-profile-measuring installation set forth in claim 1, wherein the measuring device records the actual machine profile.

3. The machine-profile-measuring installation set forth in claim 1, wherein the strand-like body is made of rubber.

4. The machine-profile-measuring installation set forth in claim 1, wherein the strand-like body is made of plastic.

5. The machine-profile-measuring installation set forth in claim 1, wherein the strand-like body is made of an elastomeric plastic material and wherein the strand-like body has a thickness 1 to 10% larger than the nominal distance of the rollers, and a longitudinal extension at least three times longer than the distance between adjacent roller axes of the roller conveyor.

6. The machine-profile-measuring installation set forth in claim 5, wherein the strand-like body is an elastomeric plastic material of the group consisting of polychlorobutadiene, butadiene/styrene-interpolymer and butadiene/acrylnitrile-interpolymer.

7. The machine-profile-measuring installation set forth in claim 5, wherein the longitudinal extension of the strand-like body is four times longer than the distance between adjacent roller axes of the roller conveyor.

8. The machine-profile-measuring installation set forth in claim 1, said sensors of said measuring device comprises inductive displacement pickups arranged in pairs and lying opposite each other, said inductive displacement pickups being arranged on a plate fastened in the strand-like body at the level of the neutral fiber and having feelers axially and perpendicularly movable in relation to the neutral fiber, which feelers are capable of being brought into touching contact with the rollers.

9. The machine-profile-measuring installation set forth in claim 8, wherein the plate, on which the inductive displacement pickups are arranged, is made of steel.

10. The machine-profile-measuring installation set forth in claim 1, wherein said sensors of said measuring device comprise pressure-measuring devices arranged in pairs and lying opposite each other, said pressure-measuring devices being arranged on a mounting plate fastened in the strand-like body at the level of the neutral fiber and having thrust bolts axially and perpendicularly movable in relation to the mounting plate, said thrust bolts being in touching contact with pressure plates, said pressure plates being embedded close to the surface of the strand-like body.

11. The machine-profile-measuring installation set forth in claim 10, wherein the pressure-measuring devices are pressure pickups.

12. The machine-profile-measuring installation set forth in claim 10, wherein the plate, on which the pressure-measuring devices are arranged, is made of steel.

13. The machine-profile-measuring installation set forth in claim 10, wherein the pressure plates are made of steel.

14. The machine-profile-measuring installation set forth in claim 1 wherein said strand-like body has, at the level of the neutral fiber, a layer having a certain thickness and comprised of a material whose thickness is not compressible by the conveyor but which is elastically bendable by the conveyor, on which layer the measuring devices are arranged.

15. The machine-profile-measuring installation set forth in claim 14, further including expansion-measuring devices arranged on the layer for measuring the expansion of said layer.

16. The machine-profile-measuring installation set forth in claim 14, wherein the layer is made of a thermosetting plastic and the thickness of the layer is (0.02 to 0.5) × D, D being the total thickness of the strand-like body.

17. The machine-profile-measuring installation set forth in claim 16, wherein the layer is made of a pure compression molding resin.

18. The machine-profile-measuring installation set forth in claim 14, wherein the layer is made of a thermoplastic and the thickness of the layer is (0.02 to 0.5) × D, D being the total thickness of the strand-like body.

19. The machine-profile-measuring installation set forth in claim 18, wherein the layer is a thermoplastic of the group consisting of polystyrene, polymethylacrylic ester, polyvinylchloride, polymethylenoxyde, higher esterified cellulose acetate, cellulose acetobutyrate, cellulose nitrate, ethyl cellulose, polyamide and polyurethan.

20. The machine-profile-measuring installation set forth in claim 14, wherein the layer is a 1 to 5 mm thick steel strip of a mild steel containing maximumly 0.10% C and 0.20 to 0.45% Mn, which steel is produced by hot rolling.

21. The machine-profile-measuring installation set forth in claim 20, wherein the steel strip is produced by cold rolling.

22. The machine-profile-measuring installation set forth in claim 20, wherein the steel strip is produced by hot and cold rolling.

23. The machine-profile-measuring installation set forth in claim 15, wherein said measuring device for measuring the expansion of the layer lying in the range of the neutral fiber comprises expansion-measuring strips arranged opposite each other in pairs and secured to said layer.

24. The machine-profile-measuring installation set forth in claim 1, wherein the strand-like body is capable of being connected by means of a detachable coupling to a dummy bar of the continuous casting plant and wherein by means of said dummy bar the strand-like body is movable through the roller conveyor, the measuring leads of the measuring devices being connected to an indicator and being laid in bores within the strand-like body and within the dummy bar.

25. The machine-profile-measuring installation set forth in claim 1, wherein the strand-like body has a steel strip as a layer, said steel strip being capable of being connected by means of a detachable coupling to a dummy bar of the continuous casting plant and by means of said dummy bar the strand-like body is movable through the roller conveyor, the measuring leads of the measuring devices being connected to an indicator and being laid in bores within the strand-like body and within the dummy bar.

* * * * *

UNITED STATES PATENT AND TRADEMARK OFFICE
CERTIFICATE OF CORRECTION

PATENT NO. : 3,983,631
DATED : October 5, 1976
INVENTOR(S) : Wilhelm Dutzler

It is certified that error appears in the above—identified patent and that said Letters Patent are hereby corrected as shown below:

First page, Abstract, third line from bottom, after "invention" insert a comma (,);

Col. 1, line 19, delete the comma (,) after "profile";

Col. 2, line 57, after "measuring" (first occurrence) insert --leads--;

Col. 3, line 67, after "bar" insert a period (.);

same line, change "with" to --With--;

Col. 4, line 60, cancel "plastic strand Figs." and insert --plastic strand 12. --.

Col. 6, line 53, Table 2, "1 to 35" should read --1 to 3.5--;

Col. 7, line 38, after "1," insert --wherein--.

Signed and Sealed this

Twenty-ninth Day of March 1977

[SEAL]

Attest:

RUTH C. MASON
*Attesting Officer*

C. MARSHALL DANN
*Commissioner of Patents and Trademarks*